3,736,163
FIBER REENFORCED INSULATING SEGMENTS
Harry P. Hoopes, Berkeley, and Horst L. Weber, Walnut Creek, Calif., assignors to Fibreboard Corporation, San Francisco, Calif.
No Drawing. Filed Feb. 2, 1971, Ser. No. 112,072
Int. Cl. C04b 15/06
U.S. Cl. 106—120            1 Claim

ABSTRACT OF THE DISCLOSURE

Molded segments of lightweight high temperature calcium silicate insulating material are reenforced by use of nodulated mineral wool fibers in place of conventional asbestos fibers.

BACKGROUND OF THE INVENTION

Asbestos fibers have long been used as reenforcing and strengthening materials in the molding of lightweight calcium silicate insulations. However, in fabrication and installation of this insulation a certain amount of dust is created which, unless good ventilation is provided, may be inhaled by those working with the product. With recent publication of numerous reports by medical researchers indicating that asbestos dust is harmful to the health, it has become very important to find a replacement fiber for asbestos in these insulating materials.

Efforts to find a suitable replacement fiber for asbestos have heretofore not proved successful. Chopped filaments of glass yarn or roving have been tried as well as conventional slag wool, rock wool, glass wool and various organic fibers. For reasons hereafter stated, the use of none of these fibers has resulted in a product suitable for commercial use.

Applicant has discovered that a special type of mineral wool, that is, nodulated mineral wool, may be used to replace asbestos in such insulating materials, preferably in combination with cellulosic fibers.

SUMMARY AND OBJECTS OF THE INVENTION

Applicant's invention comprises lightweight, molded segments of calcium silicate insulating material reenforced with nodulated mineral wool.

It is an object of the invention to provide asbestos-free molded segments of calcium silicate insulating material.

It is a further object to provide such segments reenforced by nodulated mineral wool.

It is still a further object to provide such segments reenforced by nodulated mineral wool in combination with cellulosic fibers.

PREFERRED EMBODIMENT

Lightweight molded segments of calcium silicate having densities of the order of 10 to 15 pounds per cubic foot are widely used throughout industry as heat insulating materials. These segments are usually molded as thin blocks for insulating flat surfaces or in cylindrical sections, usually 36 inches long, which are thereafter split and used to insulate pipelines. These segments have good handling and installing characteristics and very low thermal conductivity, and may be used to insulate surfaces having temperatures up to 1200° F. and higher.

To form such segments an aqueous slurry is prepared from approximately equal parts of hydrated lime or quicklime and a source of reactive silica, preferably, uncalcined diatomaceous earth. A reaction promoter or accelerator such as sodium hydroxide or sodium silicate is then added along with reenforcing fiber and, if desired, a reaction inhibitor such as common sugar. A small percentage of clay may also be added for its additional binding properties. The slurry is adjusted to a solids content which will provide molded segments of the desired density and thoroughly mixed. The reinforcing fiber has conventionally been either amosite or chrysotile asbestos or a mixture thereof, and constitutes from about 5% to 15% of the total solids in the slurry.

The slurry may then be molded into segments, for instance by the so-called "precision molded" process described in assignee's Patent No. 2,904,444 dated Sept. 15, 1959. With this method the slurry is heated to about 200° F. The slurry is retained in the mold until it sets into a firm handleable segment. The segment is then removed from the mold, cured under high pressure steam, dried and trimmed to the proper size.

An alternative molding method is to pour the cold slurry into molding pans, place the pans in a high pressure steam curing atmosphere, remove the molded segment from the pans and dry and trim to size. During the molding and curing cycles a reaction takes place between the lime and silica to form a firm, solid body of calcium silicate.

The asbestos fibers serve several important purposes in the molding process and in the final product. During molding the fibers hold water, thus thickening the slurry and permitting molding of lower density segments. The relatively rough surfaces of the individual fibers also act as points at which the reaction to form a matrix of calcium silicate may begin. The holding of water at such points also promotes the reaction, which requires water to take place. In the final molded product the fibers "tie" the calcium silicate molecules together into an integrated whole to create a handleable product. Without fiber reenforcement, segments are very brittle and will not withstand the rigors of commercial shipping and handling. The fibers further give the segments resistance to thermal shock and inhibit expansion cracking when segments are exposed to temperature changes. Additional properties which make asbestos particularly suitable are its resistance to chemical attack and its stability at high temperatures.

Chopped filaments of glass yard or roving have been tried as a replacement for asbestos, but these filaments lack several of the properties which make asbestos fibers suitable. Glass filaments do not hold water well and thus do not promote the lime-silica reaction during molding. Further, the relatively smooth surfaces of the glass filaments do not provide reaction points for formation of the calcium silicate matrix and thus do not "tie" the segment together well. Glass filaments are also susceptible to chemical attack and deterioration at the high temperatures encountered in fabricating and using the segments. Although glass filaments are available with chemical resistant coatings, such coatings frequently do not protect the filaments completely, and these coated filaments are quite expensive.

Segments molded from a slurry containing only organic fibers have been found to have substantially reduced strength and resistance to high temperatures. Apparently a rather large percentage of such fibers are destroyed during processing, and the finished segment is not adequately reenforced with fibers. If higher percentages of fiber are added, the slurry becomes too thick to mold.

Attempts to use conventional mineral wool type fibers have also encountered problems. As used herein, mineral wool shall mean artificial inorganic fibers such as slag wool, rock wool and the like. These mineral wool fibers are superior to glass filaments in chemical resistance and heat stability and in holding water in the slurry to promote the lime-silica reaction. They also have rougher surfaces for promotion of matrix formation and "tieing" the calcium silicate matrix together.

However, mineral wool is normally available in large mats of intertwined fibers which are virtually impossible to disperse into a molding slurry by any available commercial means. When such mineral wool is added to a molding slurry it remains in large wads of fibers. Slurry containing these large wads is very difficult to mold and the lack of fiber dispersion results in a brittle final product.

Applicant has discovered that a special type of mineral wool known as nodulated mineral wool may be dispersed into a slurry and used to form molded segments of high temperature calcium silicate insulation which are substantially equal in strength and handleability to segments reenforced with asbestos fibers.

Nodulated mineral wool comprises small balls or wads of fiber which are separate from each other and in which the fibers are not intertwined into a large mass. Nodulated mineral wool may be formed by passing conventional mineral wool mats through a suitable nodulating device which chops the mat into small, separate balls or wads of fiber. A method and an apparatus for nodulating mineral wool are disclosed in U.S. Patent No. 2,375,284 entitled Method of Making Mineral Wool Product, issued May 8, 1945, to H. T. Coss.

Nodulated mineral wool is available commercially from several sources. Examples are ONE-COTE fiber, sold by Eagle-Picher Industries, Inc., which is made up of small, compact balls of fiber about 1/8" to 1/4" in diameter, and "nodulated blowing wool," sold by the Rock Wool Insulations Division of Susquehanna Corporation, which consists of loose wads of fiber about 1" to 2" in diameter.

In applicant's preferred embodiment the molded segments are formed from a slurry which contains cellulosic fibers as well as nodulated mineral wool. Wood pulp and paper pulp are particularly suitable, and wood pulp fiber manufactured by the sulfite process is preferred. The slurry, and thus the final product may contain from about 3% to 15% total fiber, based on total solids. Below about 3% fiber the molded segments are brittle and lack adequate strength for handling. Above about 15% the slurry becomes too thick for processing. The preferred fiber content is from about 5% to 10%.

As previously noted, the fiber may consist entirely of nodulated mineral wool or may be a mixture of mineral wool and cellulosic fibers. If this mixture of fibers is used, it should contain at least about 25% nodulated mineral wool. Below this amount the strength and heat resistance of the final product deteriorates rapidly.

Example I

A slurry was made up of 815 lbs. of hydrated lime, 750 lbs. of uncalcined diatomaceous earth, 150 lbs. of anhydrous sodium silicate, 6 lbs. of sugar, 60 lbs. of nodulated mineral wool, 60 lbs. of sulfite pulp fibers and 50 lbs. of clay in 720 gallons of water. The slurry was thoroughly mixed and then molded into blocks and pipe covering sections by the precision molded process previously noted. Segments were cured in a high temperature steam atmosphere at 200 p.s.i. for 3 hours, and thereafter were dried. The dried segments had a density of 12 lbs. per cu. ft. The segments had a modulus of rupture, thermal conductivity and heat resistance at 1200° F. comparable to segments reenforced with an equal amount of amosite asbestos. Handleability of segments was judged to be equal to those renforced with asbestos.

Example II

The same slurry of Example I was poured into pan molds, cured in a high temperature steam atmosphere at 200 p.s.i. for 3 hours and thereafter dried. Segments had properties substantially the same as those of Example I.

Example III

A slurry the same as Example I except that it contained no sulfite pulp fibers and contained 120 lbs. of nodulated mineral wool was thoroughly mixed. The slurry was thin and slightly difficult to handle but could be processed. Segments were molded and cured as in Example I. Thermal conductivity and heat resistance at 1200° F. were substantially equal to segments of Example I. Modulus of rupture was about 80% of the segments of Example I, but the segments were judged to be strong enough for commercial use.

It can be seen from the above that applicant has molded lightweight high temperature calcium silicate segments which are reenforced by nodulated mineral wool, preferably also containing cellulosic fibers. The segments have a density of about 10 to 15 lbs. per cu. ft. and are suitable for insulating surfaces reaching a temperature of about 1200° F. or higher. The segments contain from about 3% to 15% fiber, at least about 25% of which is nodulated mineral wool.

A primary advantage of this product is that it may be manufactured without use of asbestos fibers. Any dust which may be created during processing or installation of such segments is free from asbestos fibers and the health hazards of asbesto fibers to workers are not present.

We claim:

1. A lightweight, asbestos-free molded segment of high temperature insulating material having a density of from about 10 to 15 pounds per cubic foot, the segment consisting essentially of reacted calcium silicate and reenforcing fiber, the fiber being dispersed uniformly throughout the segment, the reenforced fiber comprising from about 3% to about 15% of the weight of the segment and consisting of nodulated mineral wool and cellulosic fiber, at least about 25% of the fiber being nodulated mineral wool.

References Cited

UNITED STATES PATENTS

| 2,904,444 | 9/1959 | Hoopes et al. | 106—120 |
| 3,505,439 | 4/1970 | Moorehead et al. | 106—120 |
| 3,079,267 | 2/1963 | Konrad et al. | 106—64 |

JAMES E. POER, Primary Examiner